United States Patent
Pai et al.

(10) Patent No.: US 11,968,034 B2
(45) Date of Patent: Apr. 23, 2024

(54) METASTRUCTURED PHOTONIC DEVICES FOR BINARY TREE MULTIPLEXING OR DEMULTIPLEXING OF OPTICAL SIGNALS

(71) Applicant: X Development LLC, Mountain View, CA (US)

(72) Inventors: Sunil Pai, San Jose, CA (US); Yi-Kuei Ryan Wu, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/890,924

(22) Filed: Aug. 18, 2022

(65) Prior Publication Data

US 2024/0063934 A1 Feb. 22, 2024

(51) Int. Cl.
*H04J 14/02* (2006.01)
*H04B 10/61* (2013.01)
(Continued)

(52) U.S. Cl.
CPC ........ *H04J 14/0221* (2013.01); *H04B 10/614* (2013.01); *H04J 14/0254* (2013.01);
(Continued)

(58) Field of Classification Search
CPC .... H04J 14/0221; H04J 14/0254; H04J 14/02; H04J 14/03; H04J 14/0307;
(Continued)

(56) References Cited

U.S. PATENT DOCUMENTS

| | | | |
|---|---|---|---|
| 4,756,587 A | * | 7/1988 | Sano .................... G02B 6/2938 385/27 |
| 4,768,850 A | | 9/1988 | Moslehi et al. |

(Continued)

FOREIGN PATENT DOCUMENTS

CN 114567384 A 5/2022

OTHER PUBLICATIONS

Kuang et al, Ultra-Compact Low Loss Polymer Wavelength De-Multiplexer With Spot-Size Convertor, Jun. 2021, IEEE Photonics Journal, All Document. (Year: 2021).*

(Continued)

*Primary Examiner* — Dibson J Sanchez
(74) *Attorney, Agent, or Firm* — CHRISTENSEN O'CONNOR JOHNSON KINDNESS PLLC

(57) ABSTRACT

Photonic devices, photonic integrated circuits, optical elements, and techniques of making and using the same are described. A photonic device includes an input region adapted to receive an optical signal including a multiplexed channel characterized by a distinct wavelength, a dispersive region optically coupled with the input region to receive the optical signal, the dispersive region including a plurality of sub-regions defined by an inhomogeneous arrangement of a first material and a second material, and a plurality of output regions optically coupled with the input region via the dispersive region. The plurality of sub-regions can include an input channel section, one or more coupler sections, and one or more branching sections. The plurality of sub-regions together can configure the photonic device to demultiplex the optical signal and to isolate the multiplexed channel at a first output region of the plurality of output regions.

24 Claims, 7 Drawing Sheets

(51) Int. Cl.
*G02B 6/12* (2006.01)
*G02B 6/293* (2006.01)

(52) U.S. Cl.
CPC .......... *G02B 6/12007* (2013.01); *G02B 2006/12164* (2013.01); *G02B 6/2938* (2013.01); *H04J 14/02* (2013.01); *H04J 14/03* (2023.08); *H04J 14/0307* (2023.08)

(58) Field of Classification Search
CPC .......... H04B 10/614; G02B 6/12007; G02B 6/2938; G02B 2006/12164
USPC ............................................. 398/43–103
See application file for complete search history.

(56) References Cited

U.S. PATENT DOCUMENTS

| | | | | |
|---|---|---|---|---|
| 5,852,505 | A * | 12/1998 | Li ............... | G02B 6/2938 398/58 |
| 6,031,948 | A * | 2/2000 | Chen ............. | G02B 6/29355 398/1 |
| 6,185,345 | B1 * | 2/2001 | Singh ............ | G02B 6/12007 385/24 |
| 6,724,954 | B2 * | 4/2004 | Arai ............. | G02B 6/12007 385/27 |
| 6,728,457 | B2 | 4/2004 | Sigalas et al. | |
| 10,862,610 | B1 * | 12/2020 | Schubert ........ | G06F 30/337 |
| 11,112,563 | B2 | 9/2021 | Sakamoto et al. | |
| 11,239,276 | B2 * | 2/2022 | Roberts ......... | H01L 31/0232 |
| 2001/0012424 | A1 * | 8/2001 | Kato ............. | G02B 6/12021 385/24 |
| 2002/0106158 | A1 * | 8/2002 | Zhao ............. | G02B 6/2938 385/24 |
| 2002/0110306 | A1 * | 8/2002 | Hamada .......... | B82Y 20/00 385/11 |
| 2002/0176660 | A1 * | 11/2002 | Saito ............ | G02B 6/12007 385/39 |
| 2003/0007734 | A1 * | 1/2003 | Koshi ............ | G02B 6/29355 385/39 |
| 2004/0033004 | A1 | 2/2004 | Welch et al. | |
| 2004/0105677 | A1 * | 6/2004 | Hamada .......... | G02F 1/313 398/79 |
| 2005/0152656 | A1 | 7/2005 | Talneau et al. | |
| 2006/0098918 | A1 * | 5/2006 | Noda ............. | B82Y 20/00 385/14 |
| 2006/0126992 | A1 | 6/2006 | Hashimoto et al. | |
| 2009/0175572 | A1 * | 7/2009 | Noda ............. | G02B 6/12004 385/14 |
| 2013/0223852 | A1 * | 8/2013 | Ko .............. | G02B 6/4214 398/200 |
| 2015/0172040 | A1 | 6/2015 | Pelekhaty et al. | |
| 2015/0241630 | A1 | 8/2015 | Fujita et al. | |
| 2015/0295672 | A1 * | 10/2015 | Okayama ......... | G02B 6/2938 398/65 |
| 2016/0012176 | A1 * | 1/2016 | Liu ............... | G02B 6/107 716/112 |
| 2020/0174449 | A1 * | 6/2020 | Aydin ........... | B33Y 50/02 |
| 2021/0143930 | A1 | 5/2021 | Schubert et al. | |
| 2021/0149109 | A1 | 5/2021 | Schubert et al. | |
| 2022/0252784 | A1 * | 8/2022 | Hammond ........ | G02B 6/29346 |
| 2024/0014635 | A1 * | 1/2024 | Yoo ............. | H01S 5/142 |

OTHER PUBLICATIONS

Zhang et al, Topological inverse design of nanophotonic devices with energy constraint, Apr. 2021, Optics Express, All Document. (Year: 2021).*
Han et al, Inverse designed tunable four-channel wavelength demultiplexer, Feb. 2020, Optics Communications, All Document. (Year: 2020).*
Chien et al., Dual-band multiplexer/demultiplexer with photonic-crystal-waveguide couplers for bidirectional communications, Optics Communications 226, May 26, 2006.
Horst et al., Cascaded Mach-Zehnder wavelength filters in silicon photonics for low loss and flat pass-band WDM (de-)multiplexing, Optics Express, vol. 21, No. 10, May 20, 2013.
Tyndall et al., Ultrabroadband lattice filters for integrated photonic spectroscopy and sensing, Opti. Eng. 57(12), 127103 (2018).
Cheben, et al., "A high-resolution silicon-on-insulator arrayed waveguide grating microspectrometer with sub-micrometer aperture waveguides", Optics Express, vol. 15, No. 5, Mar. 5, 2007.
Li et al., "Chip-scale demonstration of hybrid III-V/silicon photonic integration for an FBG interrogator", Optica, vol. 4, No. 7, Jul. 2017.
Mansouree et al., "Multifunctional 2.5D metastructures enabled by adjoint optimization", Optica, vol. 7, No. 1, Jan. 2020.
Niemi et al., "Wavelength-Division Demultiplexing Using Photonic Crystal Waveguides", IEEE Photonics Technology Letters, vol. 18, No. 1, Jan. 1, 2006.
Piggott et al., "Inverse design and demonstration of a compact and broadband on-chip wavelength demultiplexer", arXiv:1504. 00095v1 [physics.optics] Apr. 1, 2015.
Piggott et al., "Fabrication-constrained nanophotonic inverse design", Scientific Reports, May 11, 2017.
Rank et al., "Toward optical coherence tomography on a chip: in vivo three-dimensional human retinal imaging using photonic integrated circuit-based arrayed waveguide gratings", Light: Science & Applications, 2021.
Shang et al., "Low-Loss Compact Silicon Nitride Arrayed Waveguide Gratings for Photonic Integrated Circuits", IEEE Photonics Journal, vol. 9, No. 5, Oct. 2017.
Shi et al., "Silicon photonic grating-assisted, contra-directional couplers", Optics Express, Feb. 11, 2013, vol. 21, No. 3.
Su et al., "Inverse design and demonstration of a compact on-chip narrowband three-channel wavelength demultiplexer", arXiv:1709. 08809v1 [physics.app-ph] Aug. 17, 2017.
Tekeste et al., "High efficiency photonic crystal based wavelength demultiplexer", Optics Express, vol. 14, No. 7, Aug. 21, 2006.
Yao et al., "Intelligent nanophotonics: merging photonics and artificial intelligence at the nanoscale", Nanophotonics, Dec. 19, 2018.
Yuan et al., "An ultra-compact dual-channel multimode wavelength demultiplexer based on inverse design", Elsevier, Jun. 24, 2021.
International Search Report and Written Opinion dated Nov. 28, 2023, in corresponding International Patent Application No. PCT/US2023/030012, 11 pages.

* cited by examiner

US 11,968,034 B2

METASTRUCTURED PHOTONIC DEVICES FOR BINARY TREE MULTIPLEXING OR DEMULTIPLEXING OF OPTICAL SIGNALS

TECHNICAL FIELD

This disclosure relates generally to photonic devices, and in particular but not exclusively, relates to photonic multiplexers and/or demultiplexers.

BACKGROUND INFORMATION

A photonic multiplexer/demultiplexer is a device that combines multiple distinct optical channels into a multiplexed optical signal or splits the multiplexed optical signal into multiple distinct optical channels. Multiplexing can include wavelength division multiplexing and time division multiplexing (e.g., for periodic signals). In the context of wavelength-division multiplexing, distinct channels can be distinct wavelength channels characterized by a respective central wavelength. In an illustrative example, fiber optic communications technology can employ multiplexed optical signals in the infrared range that include multiple individual wavelength channels as an approach to increasing the bandwidth of optical signals being sent over an optical fiber. An example of a photonic mux/demux is an arrayed-waveguide grating (AWG). AWGs are capable of multiplexing/demultiplexing multiple distinct wavelength channels into and/or out of an optical fiber. Another example of a photonic mux/demux is an optical multiplexing circuit.

FIG. 1A illustrates an AWG 100 in line with the current state of the art. AWG 100 includes an input waveguide 105, a first optical element 110, multiple waveguides 115 of different lengths, a second optical element 120, and multiple output waveguides 125. Input waveguide 105 is used to carry a multiplexed optical signal to or from first optical element 110. First optical element 110 is typically a monolithic optical medium formed by depositing silicon materials (e.g., doped silica, undoped silica, or the like) on a silicon substrate. As with first optical element 110, waveguides 115, second optical element 120, and output waveguides 125 are typically also monolithic optical elements formed from homogeneous and high-purity materials. Typically, waveguides 115 are optically isolated from each other by a gap material that induces total internal reflection. The gap material can be or include a dielectric material of relatively lower refractive index or air. Optical isolation is used to control the phase of light entering the second optical elements. To that end, waveguides 115 increase in length by a constant length increment as part of inducing phase-mismatch interference at the inlets of output waveguides 125. The coordinated effect of first optical element 110, waveguides 115, and second optical element 120 is to isolate each distinct wavelength channel of a multiplexed optical signal to a respective output waveguide 125.

Conventional techniques apply classical optical design principles to design the length increments, number of waveguides 115, as well as the size and dimensions of optical elements 110 and 120, to improve multiplexer performance and to reduce losses. However, such techniques typically include lengthening a characteristic length dimension 130 of the AWG to provide adequate path length for the phase-mismatch interference to occur while maintaining an overall shape that is compatible with CMOS systems. This leads to a larger overall device and still may not achieve the desired performance specifications (e.g., channel integrity, power loss) over a desired range of operating wavelengths. For example, silica-based AWGs can have a size of several square centimeters that limits AWG integration density on silicon-based photonic integrated circuit devices. Silicon-on-Insulator (SOI) based waveguide devices can reduce the overall dimensions of the AWG, but with reduced dimensions and the requirement for air-gapped waveguides, fabrication complexity can be prohibitive.

FIG. 1B illustrates an optical multiplexing circuit 150 in line with the current state of the art. Optical multiplexing circuit 150 is configured for wavelength-division multiplexing of a three-channel input optical signal including three distinct wavelength channels $\lambda 1$, $\lambda 2$, and $\lambda 3$. Optical multiplexing circuit 150 includes input waveguides 151-153, a first multimode conversion waveguide 156 and a second multimode conversion waveguide 157, first to fourth coupling parts 158-161, and an output waveguide 164. Each of waveguides 151-153 and MM conversion waveguides 156-157 are discrete optical elements that are physically separated from each other, being coupled at discrete positions by coupling parts 158-161. As with the AWG 100 of FIG. 1A, a lateral dimension 190 of the optical multiplexing circuit 150 is on the order of centimeters to tens of centimeters. For example, the coupling lengths of the MM conversion waveguides 156-157 can be on the order of hundreds of micrometers to several centimeters. In this way, optical multiplexing circuit 150 can have a characteristic footprint of tens of square centimeters.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for wavelength-division multiplexer/demultiplexers (mux/demux) having reduced wavelength sensitivities, improved power balance, and reduced power loss are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
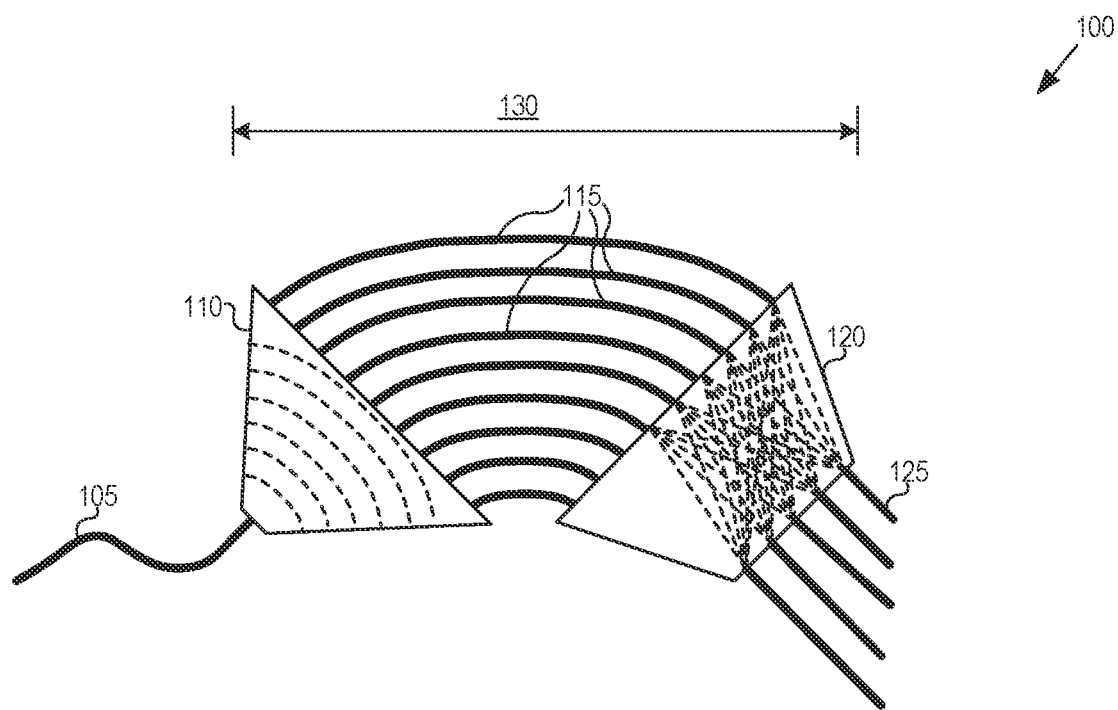
FIG. 1A (PRIOR ART) is a schematic diagram illustrating a conventional arrayed waveguide grating.
Figure 1B:
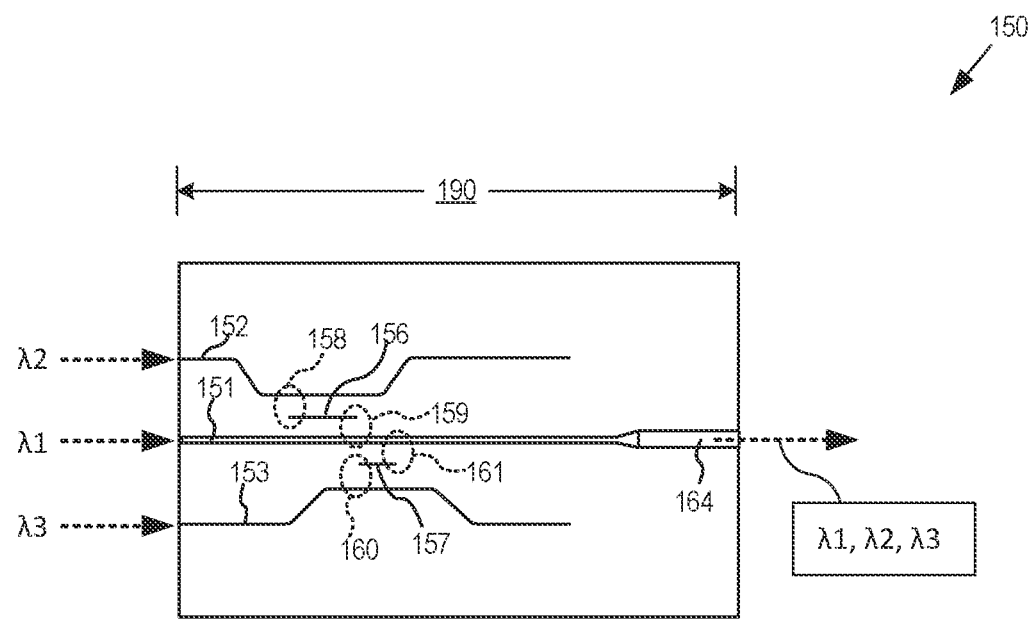
FIG. 1B (PRIOR ART) is a schematic diagram illustrating a conventional optical multiplexing circuit.

Embodiments of the photonic device(s) described herein provide improved wavelength sensitives, improved power balance, and/or reduced power loss all within a compact form factor that is orders of magnitude smaller than typical arrayed waveguide grating (AWG) photonic circuits and/or optical multiplexing circuits, as described in more detail in reference to FIG. 1A and FIG. 1B. It is believed these benefits/characteristics are achieved using structural design features that induce optical interactions between optical signals and irregular interfaces of a dispersive region that improve on the design of AWGs and optical multiplexing circuits in terms of structure and performance, permitting effective multiplexing/demultiplexing in a smaller footprint.

Figure 2A:
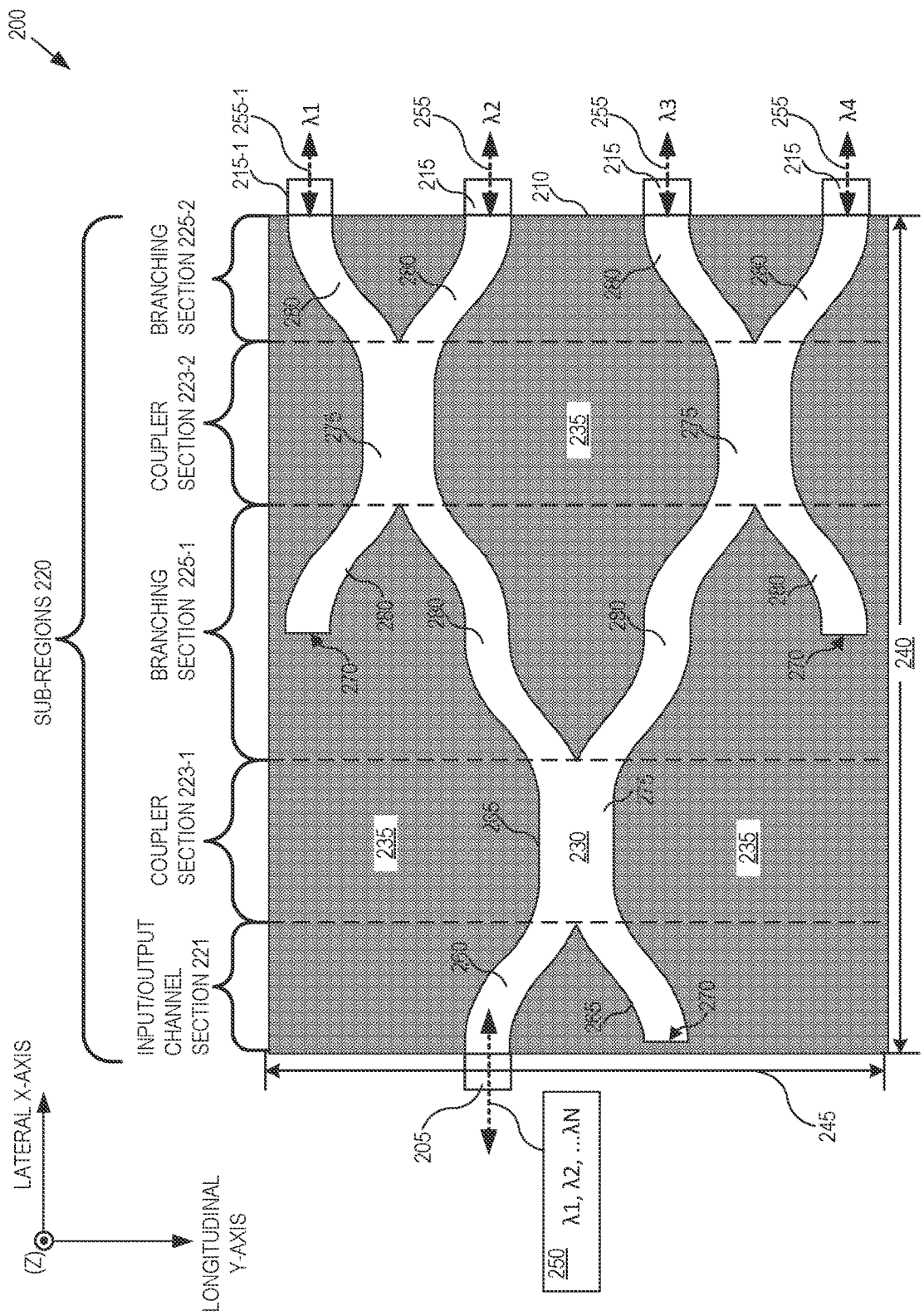
FIG. 2A is a schematic diagram of an example photonic device including a wavelength-division multiplexer/demultiplexer divided into multiple functional sub-regions affording improved performance and reduced size, in accordance with an embodiment of the disclosure.

FIG. 2A is a schematic diagram of an example photonic device 200 including a binary tree wavelength-division multiplexer/demultiplexer (mux/demux) divided into multiple functional sub-regions affording improved performance and reduced size, in accordance with an embodiment of the disclosure. Photonic device 200 is illustrated as a 1×4 wavelength-division demultiplexer, which may be operated as a demux device or a mux device, dependent upon which of its waveguide channels are stimulated with optical power. Photonic device 200 is described in relation to its operation as a demux; however, it should be appreciated that photonic device 200 may be operated to multiplex multiple distinct wavelength channels into one or more multiplexed optical signals. Similarly, photonic device 200 can be configured for mux/demux of optical signals including more or fewer than four individual channels.

The illustrated embodiment of photonic device 200 includes an input region 205, a dispersive region 210, and multiple output regions 215. The dispersive region includes multiple sub-regions 220, including an input/output channel section 221, one or more coupler sections 223, and one or more branching sections 225. Each sub-region 220 is defined by a respective inhomogeneous arrangement of a first material 230 and a second material 235. The photonic device 200 can include a surrounding material (not shown in FIG. 2A) in which the input region 205, dispersive region 210, and output regions 215 are formed as part of a CMOS-compatible fabrication process, for example, as a silicon-on-insulator (SOI) photonic integrated circuit.

Photonic device 200 is illustrated as a binary tree demultiplexer, including multiple branching sections 225 and multiple coupler sections 223. In some embodiments, photonic device 200 includes a number of coupler sections 223 and a number of branching sections 225 equal to the binary logarithm of a number of output regions 215. For example, for a photonic device 200 configured for 1×4 wavelength division multiplexing/demultiplexing, the binary logarithm of four, $\log_2(4)=2$, is two, indicating that photonic device 200 includes two coupler sections 223 and two branching sections 225. Similarly, in a photonic device 200 configured for 1×8 wavelength division multiplexing/demultiplexing, the binary logarithm of eight, $\log_2(8)=3$, is three, indicating that photonic device 200 includes three coupler sections 223 and three branching sections 225. In this way, photonic device 200 can include more or fewer coupler sections 223 and/or branching sections, based at least in part on the number of distinct wavelength channels 255 for which photonic device 200 is configured.

The binary tree configuration for which the number of coupler sections 223 and branching sections 225 is determined by a binary logarithm is a non-limiting example of branching patterns of photonic devices of the present disclosure. In some embodiments, "trinary," "quaternary," "unbalanced," and complete or partial bypass configurations (e.g., as shown in FIG. 2D) are included as part of the inverse design process that generates the inhomogeneous distribution of first material 230 and second material 235 in dispersive region 210. In this context, a "trinary" configuration refers to a branching section 225 that splits each input into three channels 280, rather than into two channels 280 for a binary-tree configuration. Similarly, a "quaternary" refers to a branching section 225 that splits each input into four channels 280. The term "unbalanced" refers to a branching configuration that is asymmetric about the lateral x-axis, as illustrated in FIG. 2C. A "bypass" configuration refers to one or more additional channels 285 that optically couple two branching sections 225 directly, rather than via a coupler channel 275 (e.g., by coupling two blank ends 270), as described in more detail in reference to FIG. 2D.

Photonic device 200 can be fabricated in a variety of materials and form factors. In one embodiment, photonic coupler 200 is fabricated as a planar waveguide structure disposed within a semiconductor material. First material 230 can be characterized by a higher refractive index core material than second material 235. For example, first material 230 can be or include silicon and second material 235 can be silicon dioxide. Other example materials include Silicon Nitride (Si3N4), Gallium Arsenide (GaAs), Indium Gallium Arsenide (InGaAs), other III-V semiconductor materials, or the like. Other non-semiconductor materials can also be used. In an embodiment, photonic device 200 is a photonic integrated circuit (PIC) disposed as a planar waveguide in a silicon-on-insulator (SOI) device. Semiconductor manufacturing processes (e.g., CMOS) are well suited for fabricating photonic device 200 due to its compact form factor and small feature sizes (e.g., micron level dimensions). A demonstrative implementation of photonic device 200 may have a first, lateral, dimension 240 of about 2.4 μm (X-axis) by 1.55 to 2.2 μm (Z-axis) and a second, longitudinal, dimension 245 (Y-axis) of about 6 μm. Of course, other dimensions, fabrication techniques, and component materials may be used. In some embodiments, first dimension 240 can be from about 1 µm to about 100 µm, from about 5 µm to about 100 µm, from about 10 µm to about 100 µm, from about 15 µm to about 100 µm, from about 20 µm to about 100 µm, from about 25 µm to about 100 µm, from about 30 µm to about 100 µm, from about 35 µm to about 100 µm, from about 40 µm to about 100 µm, from about 45 µm to about 100 µm, from about 50 µm to about 100 µm, from about 55 µm to about 100 µm, from about 60 µm to about 100 µm, from about 65 µm to about 100 µm, from about 70 µm to about 100 µm, from about 75 µm to about 100 µm, from about 80 µm to about 100 µm, from about 85 µm to about 100 µm, from about 90 µm to about 100 µm, or from about 95 µm to about 100 µm, including fractions and interpolations thereof. Similarly, second dimension 245 can be commensurate with first dimension 240 or can be different from first dimension 240. In some embodiments, dispersive region 210 can be characterized by an area in the x-y plane on the order of a square millimeter, tens of square millimeters, or a square centimeter (e.g., first dimension 240 and/or second dimension 245 being equal to or less than as much as 1000 µm). Advantageously, the footprint of photonic device 200 in the X-Y plane is as much as two orders of magnitude smaller than a typical AWG or optical multiplexing circuit. This smaller size improves integration of photonic device 200 into photonic integrated circuits and other SOI applications.

The inhomogeneous distribution of first material 230 and second material 235 define multiple refractive and/or reflective interfaces in the dispersive region 210. Through multiple interactions with the interfaces, photonic device 200 can at least partially demultiplex an input optical signal 250 including multiple multiplexed channels (λ1, λ2, ... λN), where "N" is an integer equal to 2, 3, 4, 5, 6, 7, 8, or more, isolating a first distinct wavelength channel 255-1 at a first output region 215-1 of the output regions 215. In this context, "partial demultiplexing" refers to an inhomogeneous distribution that isolates a multiplexed signal at an output region 215, rather than an individual channel. For example, photonic device 200 can demultiplex a four-channel input optical signal 250 into two output signals 255 that each include two multiplexed channels. In some embodiments, first dimension 240 and/or second dimension 245 is determined based at least in part on the number of multiplexed channels included in optical signal 250. For example, for multiplexing/demultiplexing transformations, the size of photonic device 200 can be positively correlated to the number of input channels in optical signal 250, with a larger device size being implicated by a larger number of input channels. As such, first dimension 240 and/or second dimension 245 can exceed 100 µm based at least in part on the number of input channels. In an illustrative example of a 1×4 demultiplexing device, a size of photonic device 200 can be about 45 µm×16 µm, 30 µm×16 µm, or the like. A demultiplexing photonic device for a 1×8 transformation can be larger in at least one dimension, for example 45 µm by 32 µm, 30 µm by 32 µm, or the like.

Optical signal 250 can include multiple distinct wavelength channels 255, such that sub-regions 220 together configure photonic device 200 to demultiplex the multiplexed optical signal 250 and to isolate distinct wavelength channels 255 at respective output regions 215. For example, distinct wavelength channels 255 can be characterized by respective central wavelengths in the ultraviolet, visible, or infrared ranges. For applications in fiber optic communications, infrared wavelengths can be used in wavelength ranges between 1000 nm and 1500 nm. For example, in a 1×4 wavelength-division demultiplexer, input optical signal 250 can include four distinct wavelength channels 255, including a first distinct wavelength channel characterized by a central wavelength of about 1266 nm, a second distinct wavelength channel characterized by a central wavelength of about 1269 nm, a third distinct wavelength channel characterized by a central wavelength of about 1312 nm, and a fourth distinct wavelength channel characterized by a central wavelength of about 1366 nm. In this context, the term "about" refers to a range of values equal to or within ±10% of the stated value. In line with the principles of inverse design, described below, the identification of a number of distinct wavelength channels 255 and their respective central wavelengths, as well as the composition of first material 230 and second material 235, the size of dispersive region 210, and other parameters, can influence the resulting inhomogeneous distribution of first material 230 and second material 235, and thus the overall structure of photonic device 200.

The sub-regions 220 apply respective functional transformations to the optical signal 250 resulting from the respective inhomogeneous distributions of each sub-region 220. The dispersive region 210 can be optically continuous across lateral dimension 240 and longitudinal dimension 245 over the dispersive region 210. In this context, "optically continuous" refers to the inhomogeneous arrangement of the first material and the second material being formed from a plurality of islands 295 (in reference to FIG. 2B) of second material 235 disposed in a matrix of first material 230, or vice-versa, where the matrix is coextensive with dispersive region 210. In contrast, the component elements of a typical AWG or optical multiplexing circuit, as illustrated in FIG. 1A and FIG. 1B, are discrete, compositionally homogenous, and optically isolated from each other (e.g., by an air gap or a dielectric gap material).

Input/output channel section 221 can include a respective inhomogeneous distribution of first material 230 and second material 235 that defines an input channel 260 of first material 230 in contrast to a peripheral region of second material 235. The input/output channel section 221 is referred to as "input/output" to reflect the reversible principle of operation of photonic device 200 as a mux/demux, in that input/output section 221 receives an input optical signal 250 when operating as a demux and receives an output multiplexed signal 257 when operating as a mux device.

Figure 2B:
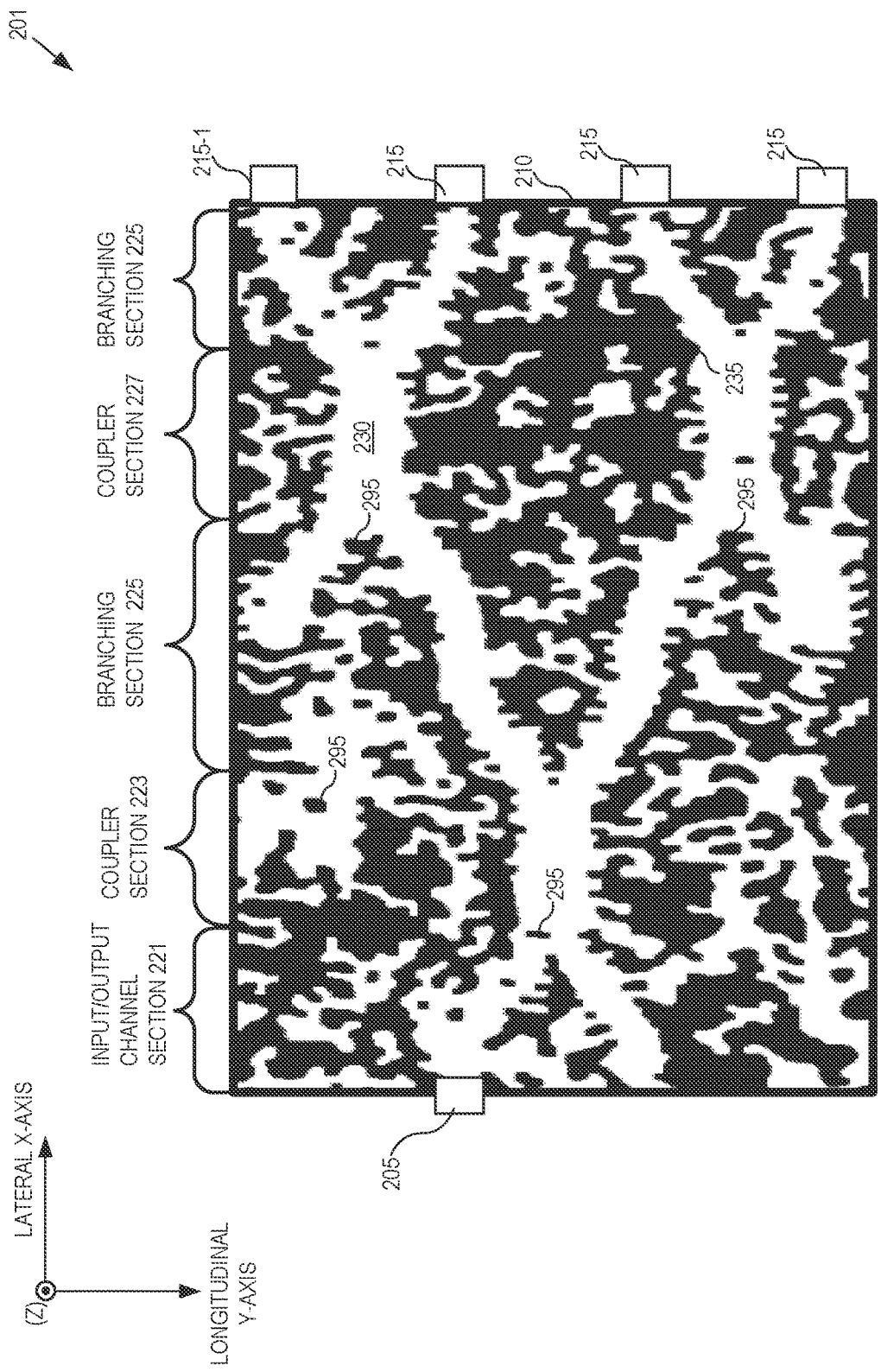
FIG. 2B is a schematic diagram of a photonic device with an inhomogeneous distribution of first material and second material in one or more functional sub-regions, in accordance with an embodiment of the disclosure.
Figure 2C:
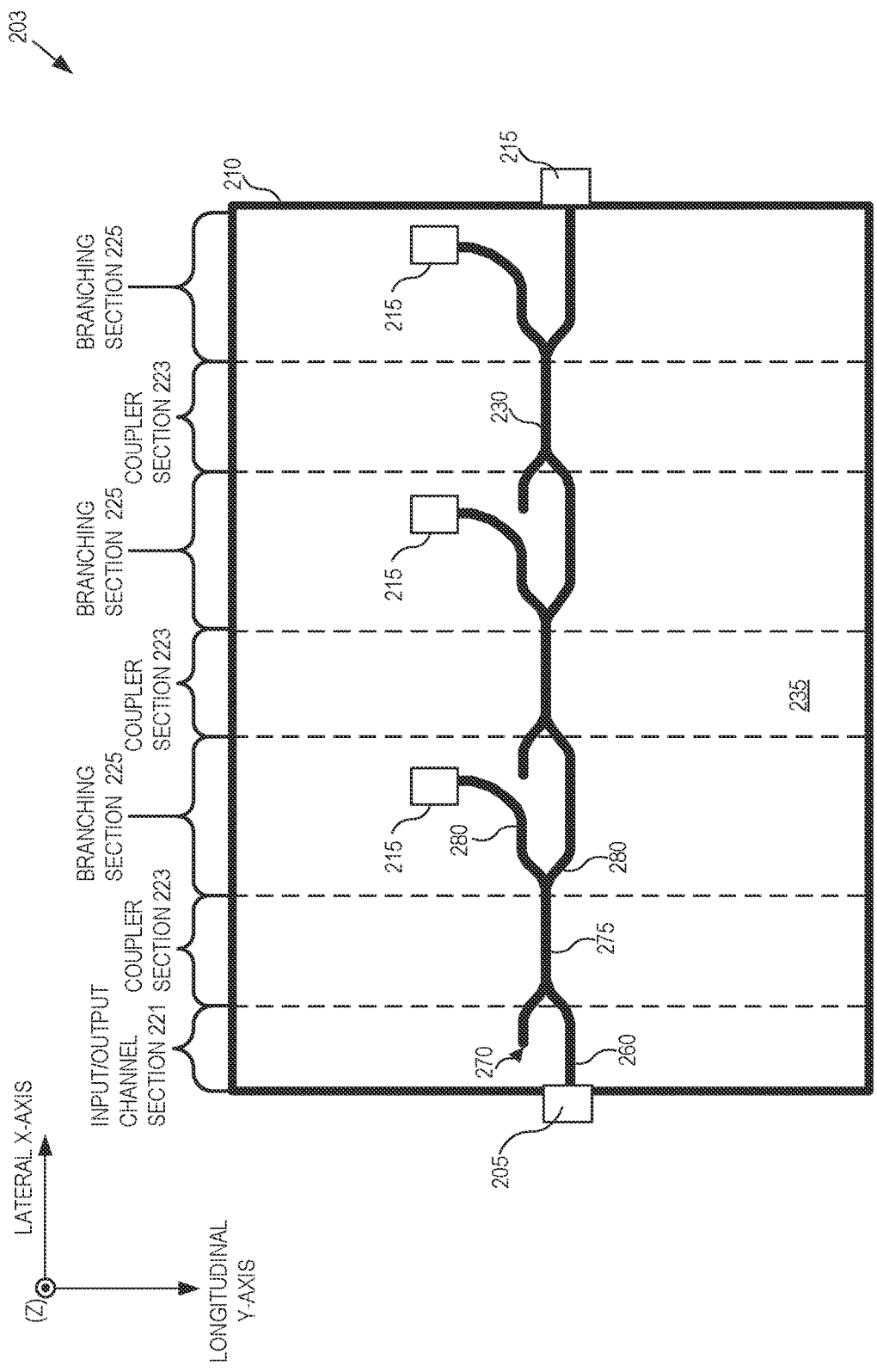
FIG. 2C is a schematic diagram of an example photonic device including a wavelength-division multiplexer/demultiplexer divided into multiple functional sub-regions in an unbalanced tree configuration, in accordance with an embodiment of the disclosure.
Figure 2D:
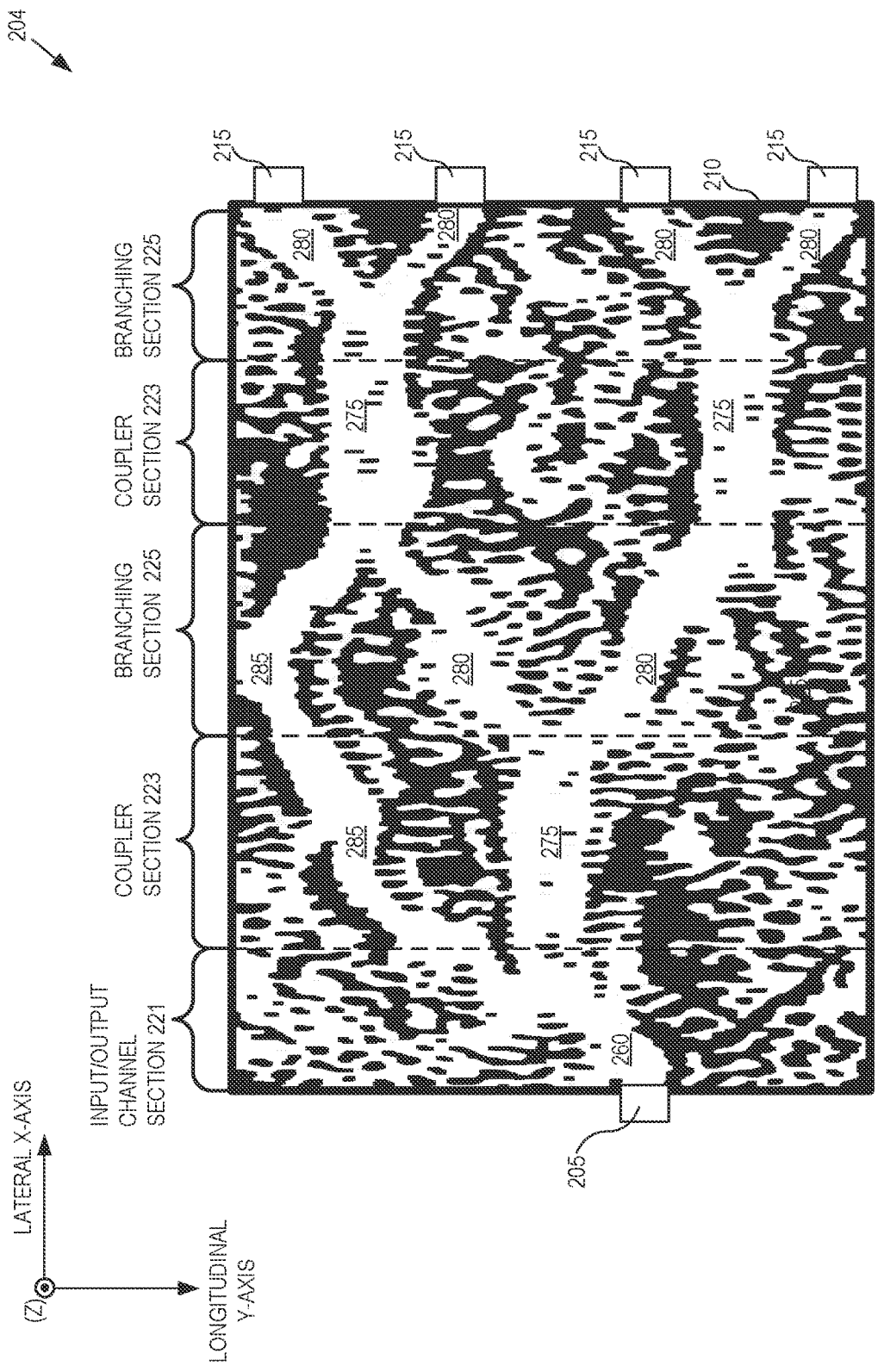
FIG. 2D is a schematic diagram of an example photonic device including a wavelength-division multiplexer/demultiplexer divided into multiple functional sub-regions in a binary tree configuration including an additional channel, in accordance with an embodiment of the disclosure.

As illustrated in FIG. 2B, input channel 260 can correspond to an area of first material 230 that is substantially free of second material 235 but can also include one or more discontinuous and irregular boundaries 265 between input channel 260 and the peripheral region. Through multiple interactions with boundaries 265, optical signal 250 can be coupled into coupler section 223 from input region 205. In some embodiments, input/output channel section 221 further comprises a second input channel 260 defined by the distribution of first material 230 and second material 235. In this way, input channels 260 can be optically intercoupled to permit electromagnetic interference therebetween, for example, where an optical path exists between the peripheral region of second material 235, as described in more detail in reference to FIG. 2B.

In some embodiments, one or more input channels 260 of input/output section 221 can include blank ends 270. Blank ends 270, as illustrated in FIGS. 2A-2C can serve a functional role as a resonator or other optically active region, where the respective inhomogenous distribution of the respective section can define channels 260 as optical cavities, acting to boost transmission of optical signals through photonic device 200. Input/output section 221 can include multiple input regions 205, optically coupled with channels 260, such that photonic device 200 can be configured to function as an add/drop device or to partially multiplex multiple input channels 255 and to generate a second multiplexed output signal 257.

Coupler section 223 comprises a respective inhomogeneous distribution of first material 230 and second material 235 that configures coupler section 223 to optically couple input/output section 221 and input region 205 with branching section 225. Similar to input channel section 221, the inhomogeneous distribution of coupler section 223 can define one or more channels 275 of first material 230 between boundaries 265 of second material 235. In some embodiments, boundaries 265 can be curvilinear, rectilinear, polygonal, fractal, or the like, based at least in part on the outcome of an inverse-design process that optimizes the inhomogeneous distribution of dispersive region 210 to configure photonic device 200 (e.g., optimizing output power, signal loss, and/or multiplexing/demultiplexing efficiency).

As with input channel section 221, boundary 265 of coupler section 223 can be irregular (e.g. defined by multiple islands 295 of second material 235 disposed in a matrix of first material 230, or vice-versa). In this way, the curvilinear, rectilinear, polygonal, etc., shape of channel(s) 275 can be developed during an iterative inverse design process, starting from an initialization design that includes discrete binary regions of first material 230 and second material 235. As such, the schematic diagram of FIG. 2A can be understood as an initial design for the inverse design process, an exemplary result of which is shown in FIG. 2B. Through optimization of the placement of islands 295 of a characteristic feature size (e.g., limited by manufacturability constraints of a given SOI system) of second material 235, the inhomogeneous distribution of in-coupler section 223 can be defined, which can diverge from the initialization design and result in irregular boundaries 265. In some embodiments, first dimension 240 and/or second dimension 245 is determined based at least in part on the characteristic feature size. For example, for multiplexing/demultiplexing transformations, the size of photonic device 200 can be positively correlated to the characteristic feature size, with a larger device size being implicated by a larger characteristic feature size. As such, first dimension 240 and/or second dimension 245 can exceed 100 µm based at least in part on the characteristic feature size.

The manufacturability of dispersive region 210 including characteristic and/or minimum feature sizes of islands 295 of second material 235 is a consideration when designing photonic device 200. The shape and configuration of boundary 265 is affected by the minimum feature size of a given fabrication process. The shapes illustrated in FIG. 2A are merely demonstrative of an initial design and may affect the feature size and contour details of structures of sub-regions 220. Inverse design principles may be used to refine or optimize the topological contours and/or feature sizes of the islands 295 and boundaries 265.

Branching section(s) 225 include multiple channels 280 defined by a respective inhomogeneous distribution of first material 230 and second material 235. Channels 280 can be optically intercoupled to permit electromagnetic interference therebetween, for example, where dispersive region is optically continuous, permitting electromagnetic fields to propagate across boundaries 265, as described in more detail in reference to FIGS. 3A-3B. As such, channels 280 can be formed of first material 230 between irregular boundaries 265 formed of second material 235. In some embodiments, continuous paths of first material 230 are formed between channels 280, as illustrated in FIG. 2B. In this way, channels 280 differ from waveguides 115 of AWG 100 and waveguides 151-154 of optical multiplexing circuit 150, which are optically isolated.

Figure 3A:
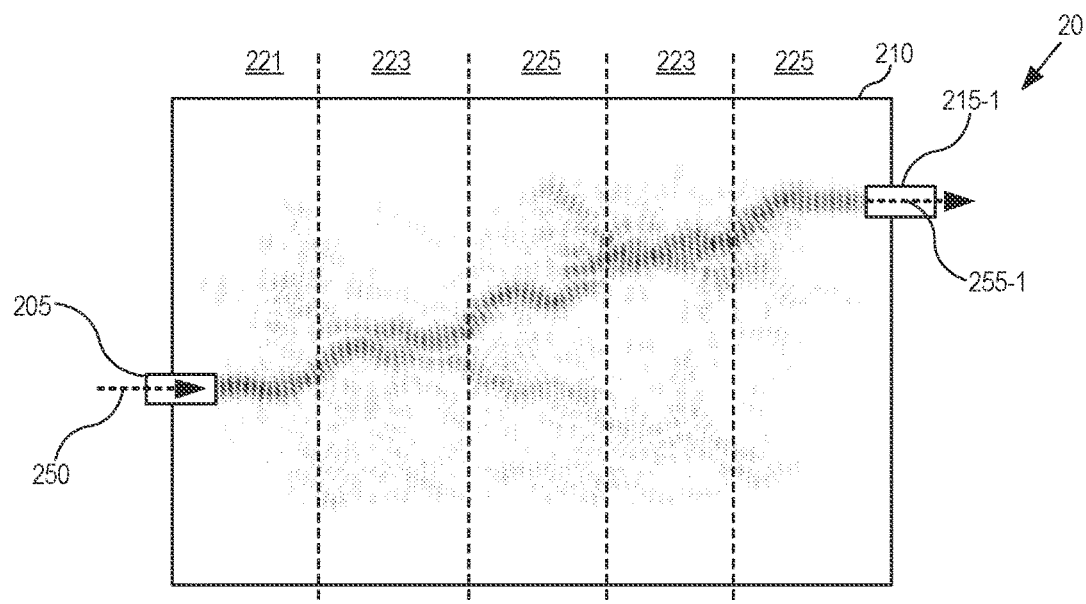
FIG. 3A is a field intensity diagram showing electromagnetic field strength as a function of position in a photonic device acting as a demultiplexer, in accordance with an embodiment of the disclosure.
Figure 3B:
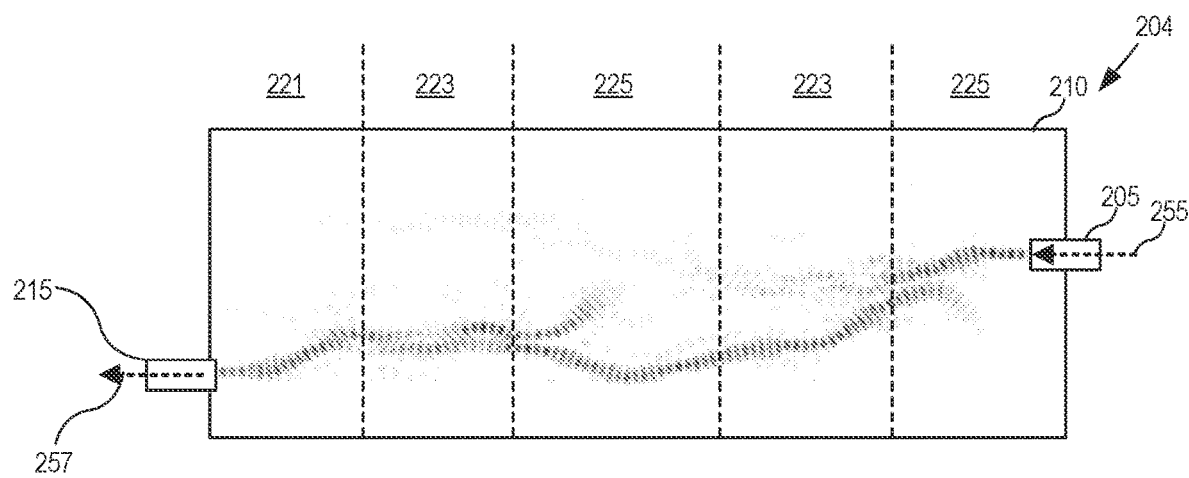
FIG. 3B is a field intensity diagram showing electromagnetic field strength as a function of position in a photonic device acting as a multiplexer, in accordance with an embodiment of the disclosure.

In some embodiments, branching section(s) 225 include one or more channels 280 that include blank ends 270. As in input/output section 221, blank ends 270 can serve a functional purpose as optical resonating cavities that can boost performance of photonic device 200. As illustrated in FIGS. 3A-3B, channels 280 including blank ends 270 can exhibit elevated field intensity relative for a given distinct wavelength channel 255, in comparison to channels 280 that are not configured to conduct the given distinct wavelength channel 255.

The final branching section 225 of photonic device (e.g., second branching section 225-2 of FIG. 2A) includes multiple channels 280 defined by a respective inhomogeneous distribution of first material 230 and second material 235. As with first branching section 225-1 of FIG. 2A, channels 280 are defined by irregular boundaries 265 and are substantially free of second material 235. In some embodiments, islands 295 of second material 235 can be disposed between boundaries 265 in channels 280, based at least in part on the results of inverse design optimization of dispersive region 210. In this way, channels 280 can be formed of first material 230 between boundaries 265 formed of second material 235. In contrast to channels 280 of first branching section 225, channels 280 of second branching section 225-2 are optically coupled with output regions 215 and, as such, omit blank ends 270. Instead, channels 280 are configured to isolate and to conduct distinct wavelength channels 255 to respective output regions 215, as part of operation as a 1×4 demultiplexer (or vice versa for operation as a 4×1 multiplexer). In some embodiments, photonic device 200 is configured to operate as a 1×8, 1×16, 1×32, etc., multiplexer, in which cases second branching section 225-2 can include blank ends 270. For example, in a 1×8 binary tree configuration, photonic device 200 can include four channels 280 with blank ends 270 in second branching section 225-2 and can include a third branching section 225-3 that includes eight channels 280 that are optically coupled with eight output regions 215.

Inverse design principles may be applied to design, refine or optimize any or all of the topological shapes, contours (including the curvatures of sidewalls), or feature sizes of photonic coupler 200. For example, an inverse design simulator (aka design model) may be configured with an initial design such as a 1×4 binary tree, a 1×4 unbalanced tree, or an initial design of photonic device 200 (e.g., based at least in part on the schematic illustrated in FIG. 2A or FIG. 2C), to perform a forward operational simulation of the initial design (e.g., using Maxwell's equations for electromagnetics). The output of the forward operational simulation is a simulated field response at output regions 215. Specific performance parameters of this output field response may be selected as parameters of interest (e.g., power loss, power imbalance, etc.) and are referred to as simulated performance parameters. The simulated performance parameters are used by a performance loss function to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error (e.g., loss gradients) is backpropagated through the design model during the adjoint simulation to generate a structural design error at input region section 205. Backpropagation of the performance loss error facilitates the computation of additional performance gradients, such as structural gradients that represent the sensitivity of the performance loss value to changes in the structural material properties (e.g., topology, material types, etc.) of photonic device 200. These gradients are output as a structural design error, which may then be used by a structural optimizer to perform an iterative gradient descent (e.g., stochastic gradient descent) that optimizes or refines the initial structural design to generate a revised structural design. The forward and reverse simulations may then be iterated until the performance loss value falls within acceptable design criteria. The above description is merely an example inverse design technique that may be used to refine or optimize the features and topology of photonic device 200. It is appreciated that other inverse design techniques alone, or in combination with other conventional design techniques, may also be implemented.

FIG. 2B is a schematic diagram of a photonic device 201 with an inhomogeneous distribution of first material 230 and second material 235 in one or more functional sub-regions 220, in accordance with an embodiment of the disclosure. Photonic device 201 is an example result of an inverse design optimization using the schematic diagram illustrated for photonic device 200 of FIG. 2A. For example, dispersive region 210 can include an inhomogeneous distribution of silicon and silicon oxide features (e.g., islands 295), an inhomogeneous distribution of differently doped semiconductor material, or otherwise. The inhomogeneous distribution of first material 230 and second material 235 can include an arrangement or pattern of different refractive material features/portions that collectively apply multiple transformations to optical signals received at input regions 205 to demultiplex constituent distinct wavelength channels 255 and isolate individual channels 255 at respective output regions 215, or vice versa. The inverse design techniques described above may be applied to determine the specific material combinations, feature sizes, and feature arrangement (i.e., pattern) to achieve the desired phase matching function via appropriate selection of the performance loss function and target performance values.

From the schematic diagram of FIG. 2A, is can be understood that the number of channels 275 of coupler sections 223 increases progressively for each additional coupler section 223. As such, for a binary-tree configuration, a first coupler section 223-1 includes one channel 275, a second coupler section 223-2 includes two channels 275, a third coupler section 223 includes four channels 275, a fourth coupler section 223 includes eight channels 275, etc., increasing in number by multiples of two for a binary-tree design. FIG. 2C, by contrast, in an unbalanced tree configuration, does not include progressively increasing numbers of channels 275.

In some embodiments, the number of channels 275 does not increase with increasing numbers of coupler sections 223. In such configurations, referred to as "unbalanced trees" configurations, illustrated in FIG. 2C, each coupler section 223 includes one channel 275 and each branching section 225 includes two channels 280, of which one is used as a throughput channel and a second is used as an output channel. In unbalanced tree configurations, a photonic device 202 can be designed as a sequence of partial demultiplexer/multiplexer subregions that isolate a given distinct wavelength channel 255 for each branching section 225 and generate a throughput signal that is coupled into a subsequent branching section 225 by the following coupler section 223.

In some embodiments, the inverse design process can produce a design that includes one or more additional paths 285, illustrated in FIG. 2D, that optically couple two blank ends 270 of the initial design with a channel that is not included in the initial design. In this way, the inverse design process can result in a photonic device 204 that does not directly reproduce the initial design, but rather can adapt, modify, or otherwise alter one or more structural details of the initial design in a way that improves performance of photonic devices as wavelength-division multiplexers/demultiplexers.

FIG. 3A is a field intensity diagram showing electromagnetic field strength as a function of position in a demultiplexer 201 of FIG. 2B. Similarly, FIG. 3B is a field intensity diagram showing electromagnetic field strength as a function of position in a multiplexer 204 of FIG. 2D. FIGS. 3A-3B represent simulation results generated using the structures shown in FIG. 2B for different sizes of dispersive region 210, with darker coloration indicating greater field intensity. As illustrated, photonic device 201 isolates a distinct wavelength channel 255 to a respective output region 215-1 (FIG. 4A) and photonic device 204 generates a multiplexed signal 250 including a distinct wavelength channel 255 at output region 215 (FIG. 4B).

Dispersive regions 210 of photonic devices 201 and 204 can be optically continuous in at least two dimensions, as indicated by the nonzero values of field intensity over sub-regions 220 in two spatial dimensions. Advantageously, the structures illustrated in FIG. 2B and FIG. 2D, being exemplary of photonic devices of the present disclosure, can improve multiplexing/demultiplexing performance in a photonic device in a smaller footprint than what is otherwise possible for AWGs or optical multiplexing circuits that rely on mutually optically isolated waveguides 115 and phase-mismatch interference to perform wavelength-division mux/demux.

Figure 4:
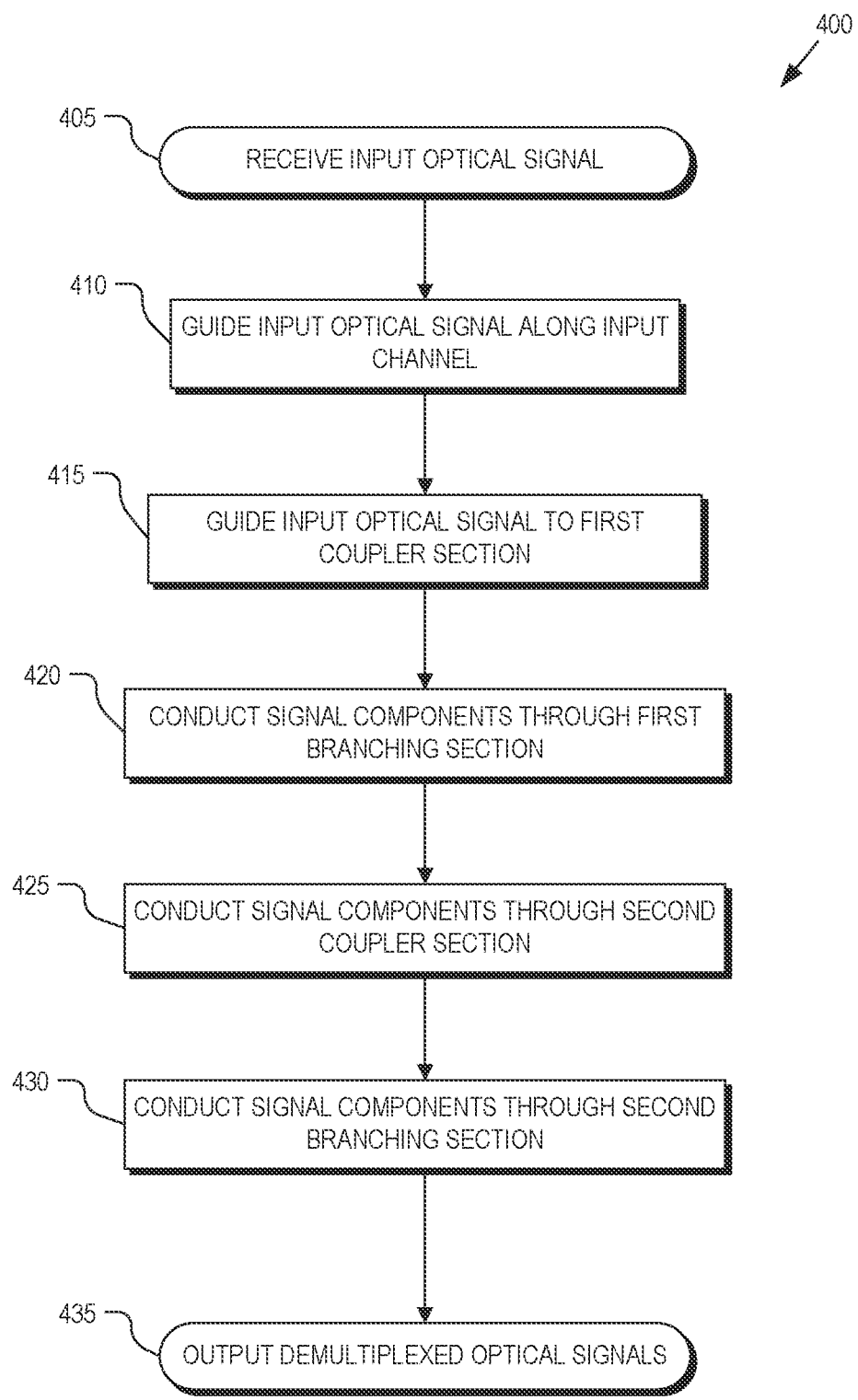
FIG. 4 is a flow chart illustrating operation of the photonic devices of FIGS. 2A-2B as a wavelength-division multiplexer, in accordance with an embodiment of the disclosure.

FIG. 4 is a flow chart illustrating an example process 400 of the photonic devices 200 and 203 of FIG. 2A and FIG. 2C, in accordance with an embodiment of the disclosure. Process 400 describes a wavelength-division demultiplexing function of photonic device 200; however, it should be appreciated that photonic device 200 can also operate in reverse as a multiplexer by stimulating output regions 215 with multiple distinct wavelength channels 255. Photonic device 200 can operate as a demultiplexer in accordance with the described order of process operations 405-455. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

At process block 405, input optical signal 250 is received at input region 205. Input region 205 couples optical signal 250 into input channel 260 that guides optical signal 250 toward in-coupler section 223 as part of process block 410. As described in more detail in reference to FIG. 2A, propagation of input optical signal 250 can include multiple interactions with reflective/refractive interfaces between first material 230 and second material 235, for example, at boundaries 265.

At process block 415, optical signal 250 is coupled into first coupler section 223-1, across multiple channels 280, as illustrated in FIG. 2A and FIG. 3A. Also illustrated in FIG. 3A, electromagnetic interference between channels 280 can be extensive as distinct wavelength channels are coupled into first branching section 225-1, at process block 420, due at least in part to the presence first material 230 that optically intercouples channels 280 via one or more optical paths between channels 280.

At process block 425, a second coupler section 223-2 conducts electromagnetic radiation including distinct wavelength channels 255 from first branching section 225-1 to second branching section 225-2 as part of a 1×4 demultiplexing operation. As illustrated in FIG. 3A, the geometry of channels 280 and the orientation of output regions 215 relative to branch channels 280 induces electromagnetic interference that isolates first distinct wavelength channel 255-1 at first output region 215-1. In this way, for a multiplexed optical signal 250 including multiple distinct wavelength channels 255, photonic device 200 can be configured by the inhomogeneous distribution of first material 230 and second material 235 in dispersive region 210 to output multiple individual distinct wavelength channels 255 at respective output regions 215 (process block 435).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic device, comprising:
    an input region adapted to receive an optical signal including a multiplexed channel, the multiplexed channel characterized by a distinct wavelength;
    a dispersive region, optically coupled with the input region to receive the optical signal, the dispersive region including a plurality of sub-regions defined by an inhomogeneous arrangement of a first material and a second material; and
    a plurality of output regions, optically coupled with the input region via the dispersive region;
    wherein:
        the plurality of sub-regions include an input channel section, one or more coupler sections, and one or more branching sections;
        the plurality of sub-regions together configure the photonic device to demultiplex the optical signal and to isolate the multiplexed channel at a first output region of the plurality of output regions; and
        the one or more coupler sections includes a first coupler section, the first coupler section including a channel of the first material, wherein the first coupler section is optically coupled to a first branching section included in the one or more branching sections, and wherein the channel of the first material branches into at least two separate channels of the first material within the first branching section.

2. The photonic device of claim 1, wherein the photonic device comprises a number of coupler sections included in the one or more coupler sections and a number of branching sections included in the one or more branching sections equal to a binary logarithm of a number of output regions included in the plurality of output regions.

3. The photonic device of claim 1, wherein the input channel section comprises an input channel defined by a first distribution of the first material and the second material, and wherein the input channel is formed of the first material between boundaries formed of the second material.

4. The photonic device of claim 3, wherein the input channel is a first input channel, wherein the input channel section further comprises a second input channel defined by the first distribution of the first material and the second material, and wherein the first input channel and the second input channel are optically intercoupled to permit electromagnetic interference therebetween.

5. The photonic device of claim 1, wherein a first coupler section of the one or more coupler sections is optically coupled with the input region via the input channel section, wherein a second coupler section is optically coupled with the first coupler section via a first branching section of the one or more branching sections, wherein the first coupler section comprises one or more channels defined by a second distribution of the first material and the second material, wherein the second coupler section comprises two or more channels defined by a third distribution of the first material and the second material, and wherein the second coupler section comprises twice as many channels as the first coupler section.

6. The photonic device of claim 1, wherein the output regions of the plurality of output regions are respectively optically coupled with a plurality of channels of a branching section of the one or more branching sections, the plurality of channels being defined by a fourth distribution of the first material and the second material and wherein the plurality of channels is formed of the first material between boundaries formed of the second material.

7. The photonic device of claim 1, wherein the optical signal comprises a plurality of multiplexed channels characterized by respective distinct wavelength channels and wherein the plurality of sub-regions together configure the photonic device to demultiplex the multiplexed optical signal and to isolate the plurality of multiplexed channels at respective output regions of the plurality of output regions.

8. The photonic device of claim 7, wherein the plurality of distinct wavelength channels comprises:
    a first distinct wavelength channel characterized by a central wavelength of about 1266 nm;
    a second distinct wavelength channel characterized by a central wavelength of about 1269 nm;
    a third distinct wavelength channel characterized by a central wavelength of about 1312 nm; and
    a fourth distinct wavelength channel characterized by a central wavelength of about 1366 nm.

9. The photonic device of claim 1, wherein the plurality of sub-regions is optically continuous in at least two dimensions over the dispersive region.

10. The photonic device of claim 1, wherein the inhomogeneous arrangement of the first material and the second material comprises a plurality of islands of the second material disposed in a matrix of the first material, and wherein the matrix is coextensive with the dispersive region.

11. The photonic device of claim 1, wherein the channel of the first material within the first coupler section and the at least two separate channels of the first material within the first branching section are defined by respective inhomogeneous distributions of the first material and the second material within the first coupler section and the first branching section.

12. The photonic device of claim 1, wherein the one or more coupler sections includes a second coupler section, and wherein the first branching section is disposed between the first coupler section and the second coupler section.

13. The photonic device of claim 1, wherein the input channel section and the one or more branching sections include one or more discontinuous or irregular boundaries defined by the inhomogeneous arrangement of the first material and the second material, and wherein the dispersive region is optically continuous to permit electromagnetic fields to propagate across the one or more discontinuous or irregular boundaries.

14. A photonic device, comprising:
a plurality of input regions adapted to receive a plurality of distinct channels characterized by respective distinct wavelengths;
a dispersive region, optically coupled with the plurality of input regions to receive respective distinct channels of the plurality of distinct channels, the dispersive region including a plurality of sub-regions defined by an inhomogeneous arrangement of a first material and a second material; and
an output region, optically coupled with the plurality of input regions via the dispersive region;
wherein:
the plurality of sub-regions include one or more coupler sections, one or more branching sections, and an output channel section;
the plurality of sub-regions together configure the photonic device to multiplex at least a subset of the plurality of distinct channels and to provide a multiplexed output signal at the output region; and
the one or more coupler sections includes a first coupler section, the first coupler section including a channel of the first material, wherein the first coupler section is optically coupled to a first branching section included in the one or more branching sections, and wherein the channel of the first material branches into at least two separate channels of the first material within the first branching section.

15. The photonic device of claim 14, wherein the photonic device comprises a number of coupler sections and a number of branching sections equal to a binary logarithm of a number of input regions included in the plurality of input regions.

16. The photonic device of claim 14, wherein the output channel section comprises an output channel defined by a first distribution of the first material and the second material, the output channel optically coupled with the output region, and wherein the output channel is formed of the first material between boundaries formed of the second material.

17. The photonic device of claim 16, wherein the output channel is a first output channel, wherein the output channel section further comprises a second output channel defined by the first distribution of the first material and the second material, and wherein the first output channel and the second output channel are optically intercoupled to permit electromagnetic interference therebetween.

18. The photonic device of claim 17, wherein the multiplexed output signal is a first multiplexed output signal, wherein the photonic device further comprises a second output region, optically coupled with the second output channel, and wherein the plurality of sub-regions together configure the photonic device to provide a second multiplexed output signal at the second output region.

19. The photonic device of claim 14, wherein a first coupler section of the one or more coupler sections is optically coupled with the output region via the output channel section, wherein a second coupler section is optically coupled with the first coupler section via a first branching section of the one or more branching sections, wherein the first coupler section comprises one or more channels defined by a second distribution of the first material and the second material, wherein the second coupler section comprises two or more channels defined by a third distribution of the first material and the second material, and wherein the second coupler section comprises twice as many channels as the first coupler section.

20. The photonic device of claim 14, wherein the input regions of the plurality of input regions are respectively optically coupled with a plurality of channels of a branching section of the one or more branching sections, the plurality of channels being defined by a fourth distribution of the first material and the second material, and wherein the plurality of channels are formed of the first material between boundaries formed of the second material.

21. The photonic device of claim 14, wherein the plurality of distinct wavelength channels comprises:
a first distinct wavelength channel characterized by a central wavelength of about 1266 nm;
a second distinct wavelength channel characterized by a central wavelength of about 1269 nm;
a third distinct wavelength channel characterized by a central wavelength of about 1312 nm; and
a fourth distinct wavelength channel characterized by a central wavelength of about 1366 nm.

22. The photonic device of claim 14, wherein the plurality of sub-regions is optically continuous in at least two dimensions over the dispersive region.

23. The photonic device of claim 14, wherein the inhomogeneous arrangement of the first material and the second material comprises a plurality of islands of the second material disposed in a matrix of the first material, and wherein the matrix is coextensive with the dispersive region.

24. A photonic device, comprising:
an input region adapted to receive an optical signal including a multiplexed channel, the multiplexed channel characterized by a distinct wavelength;
a dispersive region, optically coupled with the input region to receive the optical signal, the dispersive region including a plurality of sub-regions defined by an inhomogeneous arrangement of a first material and a second material; and
a plurality of output regions, optically coupled with the input region via the dispersive region;
wherein:
the plurality of sub-regions include an input channel section, one or more coupler sections, and one or more branching sections;
the plurality of sub-regions together configure the photonic device to demultiplex the optical signal and to isolate the multiplexed channel at a first output region of the plurality of output regions; and
a first coupler section of the one or more coupler sections is optically coupled with the input region via the input channel section, wherein a second coupler section is optically coupled with the first coupler section via a first branching section of the one or more branching sections, wherein the first coupler section comprises one or more channels defined by a distribution of the first material and the second material, wherein the second coupler section comprises two or more channels defined by a different distribution of the first material and the second material, and wherein the second coupler section comprises twice as many channels as the first coupler section.

* * * * *